(12) United States Patent
Kolb et al.

(10) Patent No.: US 6,431,199 B1
(45) Date of Patent: Aug. 13, 2002

(54) VENT CONTROL SYSTEM

(75) Inventors: Richard P. Kolb, Prairieview, IL (US); Harvey Ruth, Maryland Heights, MO (US)

(73) Assignee: Bombardier Motor Corporation of America, Grant, FL (US)

(*) Notice: Subject to any disclaimer, the term of this patent is extended or adjusted under 35 U.S.C. 154(b) by 0 days.

(21) Appl. No.: 09/681,022

(22) Filed: Nov. 28, 2000

(51) Int. Cl.$^7$ .............................................. F16K 24/04
(52) U.S. Cl. ..................... 137/202; 123/516; 137/340
(58) Field of Search ....................... 123/516; 137/2, 137/202, 340

(56) References Cited

U.S. PATENT DOCUMENTS

| | | | | |
|---|---|---|---|---|
| 2,138,069 A | * | 11/1938 | Nicholas .................. | 137/202 X |
| 2,998,057 A | * | 8/1961 | Graham .................... | 137/202 X |
| 3,586,032 A | * | 6/1971 | Weinstein .................... | 137/202 |
| 4,079,743 A | * | 3/1978 | Weston .................... | 137/202 X |
| 4,763,684 A | * | 8/1988 | Kelch ........................ | 137/192 |
| 5,119,790 A | * | 6/1992 | Olson ........................ | 123/516 |
| 6,012,434 A | * | 1/2000 | Hartke et al. ............... | 123/516 |
| 6,257,208 B1 | * | 7/2001 | Harvey ..................... | 123/516 |

* cited by examiner

Primary Examiner—Gerald A. Michalsky
(74) Attorney, Agent, or Firm—Timothy J. Ziolkowski; J. Mark Wilkinson

(57) ABSTRACT

A vent control system having a closed biased vent valve is used to separate vapor and/or air from a liquid in an enclosed chamber. The closed biased vent valve has a float having an upwardly extending float arm which cooperates with a lever arm of the closed biased vent valve to prevent unintended release of vapor or liquid from the enclosed chamber. The upwardly extending float arm and the lever arm are coupled to one another when the float is located beneath a designated level in the enclosed chamber and are decoupled from one another when the float rises above the designated level. The vent control system is much less susceptible to vibration induced vent opening than a traditional vent valve. The vent control system is well suited for use in a fuel vapor separator that includes a housing having the enclosed chamber formed within it.

15 Claims, 4 Drawing Sheets

VENT CONTROL SYSTEM

BACKGROUND OF INVENTION

The present invention relates generally to a vent control system and, more particularly, to a closed biased vent valve used in. a fuel vapor separator.

Vent valves are used in a variety of applications to remove vapor or air from a liquid in a container. The typical vent valve operates to expel the vapor as the fluid enters the vessel, thereby allowing the fluid to enter the vessel without being restricted by vapor within the vessel. Some of these systems are not required to be pressurized. The venting arrangement for these unpressurized systems can be as simple as an open vent line located on the top of the vessel. Other. unpressurized systems may have a check valve in the vent line to prevent return vapor flow into the vessel, and still other systems may have a vapor recovery system to return the fluid vapors back to the vessel while expelling vapor.

Pressurized systems must incorporate measures to expel air or vapor via a venting system that allows the vessel to become pressurized after venting. Vent valves used in pressurized systems typically include a needle and seat arrangement wherein the needle is operated by a float assembly to engage and disengage a stationary seat at the top of the vessel. When the vessel is empty, or the fluid level in the vessel is low, the float pulls the needle into an open position to allow venting. As the fluid fills the vessel, the float moves upward and closes the needle against the seat.

One application for vent valves or vapor release valves is in fuel vapor separators. Fuel vapor separators are often used in fuel delivery systems of internal combustion engines to remove entrained vapor from fuel. Heat {build-up} in an engine can adversely affect the engine's fuel delivery system by causing fuel to vaporize before it is introduced into the engine's combustion chamber. The vaporized fuel interferes with proper engine combustion and, consequently, with engine power and performance. Fuel vapor separators are used for reducing or eliminating vaporized fuel in the fuel delivery system. The typical fuel vapor separator includes a housing through which fuel passes and in which vapor is allowed to separate from the fuel. The fuel vapor is vented from the fuel vapor separator through a vent valve, which is usually of a movable needle and stationary seat type that is operated by a float assembly as previously described. After venting is complete, the vent valve closes upon consequent filling of the fuel vapor separator with fuel and the resultant upward float movement.

Float operated vent valves can open prematurely in some systems which lead to unintended venting of liquid from the associated chamber. For instance, outboard marine engines are subjected to oscillations and vibrations when the boat is driven over turbulent waves. These oscillations and vibrations can cause the float in the engine's fuel vapor separator to bounce, leading to unintended opening of the vent valve, which allows fuel to vent and potentially flood the engine. Therefore, it would be desirable to design a vent valve that combats unintended or premature vent valve opening.

SUMMARY OF INVENTION

The present invention solves the aforementioned problems by providing a vent control system that has a closed biased vent valve. The invention includes a float having an upwardly extending float arm and a lever arm, which selectively disengages from one another upon unwanted float movement within a chamber to prevent unintended release of vapor or fuel from the chamber. This vent control system is much less susceptible to vibration induced vent opening than a traditional vent valve and significantly reduces engine sputtering caused by fuel entering the engine through the vent system, which is often referred to as engine spit.

In accordance with one aspect of the invention, a vent control system for a fuel vapor separator includes a housing that has an enclosed fuel chamber and a fuel float having an upwardly extending float arm located in the enclosed fuel chamber. A lever arm, connected to a closed biased vent valve, is coupled to the float arm such that the float arm and the lever arm are configured to decouple from one another when the float rises to a certain level within the fuel chamber.

In accordance with another aspect of the invention, a method is provided for reducing engine spit. The method includes transferring fuel into an enclosed fuel chamber from at least one fuel injector through a plurality of fuel inlet ports and venting vapor accumulating within the enclosed chamber via selective opening of a closed biased vent valve. The method further includes allowing flow movement vertically without opening the closed vent valve within the enclosed fuel chamber thereby reducing engine spit caused by unintended opening of the closed biased vent valve due to engine vibration.

In accordance with yet another aspect of the invention, a means is provided for transferring fuel into an enclosed fuel chamber from a fuel source and venting vapor that is accumulated within the enclosed fuel chamber via selective opening of a closed biased vent valve. A means is also provided for allowing float movement vertically without opening the closed biased vent valve, thereby reducing engine spit caused by unintended opening of the closed biased vent valve due to the engine vibration.

Various other features, objects and advantages of the present invention will be made apparent from the following detailed description and the drawings.

BRIEF DESCRIPTION OF DRAWINGS

The drawings illustrate a preferred mode presently contemplated for carrying out the invention.

In the drawings.

DETAILED DESCRIPTION

The operating environment of the present invention will be described with respect to a two-cycle outboard marine engine. However, it will be appreciated that this invention is equally applicable for use with a four-cycle engine, a diesel engine, or in other types of fuel distribution systems.

Figure 1:
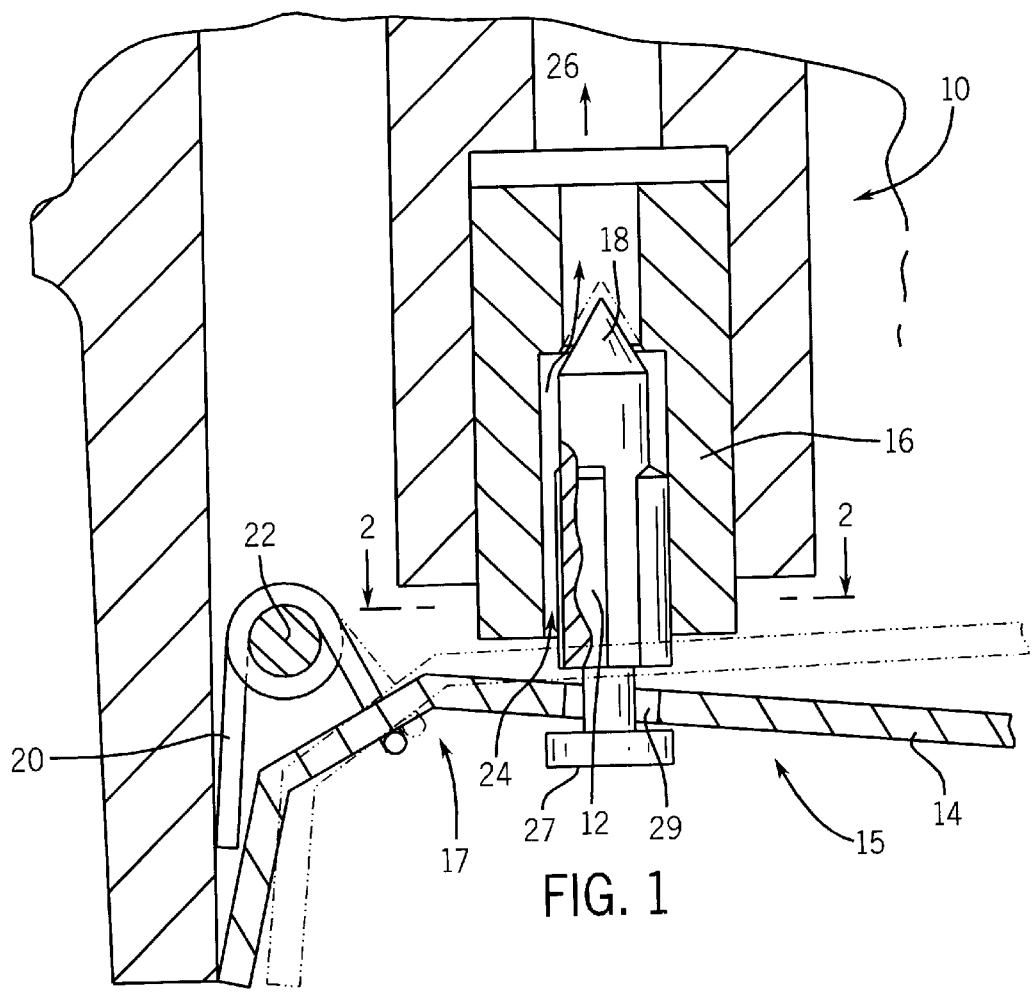
FIG. 1 is a sectional elevation view of a closed biased vent valve constructed in accordance with the present invention, showing the closed biased vent valve in an open venting position.

FIG.1 shows a closed biased vent valve 10 (hereinafter valve) in an open venting position in accordance with the present invention. It has a needle 12 in a valve body 28 having a seat 16. The valve 10 has inlet and outlet ports 24, 26 in valve body 28 that allow vapor passage. The needle 12 has a frusto-conical surface 18 in its upper portion, which engages with the seat 16 to close the valve 10. A head 27 of the needle 12 extends through a bore 29 of a lever arm 14. The lever arm 14 is engaged by a spring 20 mounted on a pin 22 at end 17. The spring 20 is configured to bias the lever arm 14 counterclockwise as viewed in FIG. 1 and to bias the needle 12 against the seat 16 to hold the valve 10 in its closed position. As a result of the arrangement, as the lever arm 14 pivots clockwise or counterclockwise, the needle 12 disengages or engages with the seat 16 to place the valve 10 in either its open or closed position, respectively.

Figure 2:
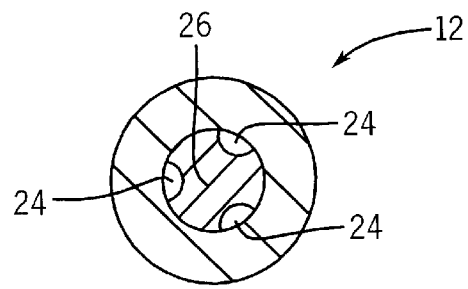
FIG. 2 is a cross-sectional plan view of a portion of the closed biased vent valve taken along line 2—2 of FIG. 1.

FIG. 2 shows a cross section of the movable needle 12. The needle 12 has a circular cross section, which allows vapor flow through a plurality of flow paths 24 in the inlet port 26 of the valve 10. Vapor is allowed to pass through flow paths 24 when the needle 12 is moved downwardly within the seat 16, when the valve 10 is in its open position.

The vent valve 10 is usable in a variety of applications to vent vapor or air from a chamber that contains liquid. One such application is the:fuel vapor separator 30 illustrated in FIG. 3. The fuel vapor separator 30 includes a housing 32 having two opposed ends, a top cover 36a and a bottom cover 36b, spaced apart by the housing 32. The fuel vapor separator 30 also includes a fuel distribution network 70 which transfers fuel to the fuel injectors (not shown) through a plurality of outlet ports 84. The bottom cover 36b has an inlet port 38, which receives fuel from a high-pressure fuel pump 130, shown in FIG. 5, and transfers the fuel to the fuel distribution network 70. Excess fuel from the fuel injectors returns to an enclosed fuel chamber 62 of the fuel vapor separator 30 through a plurality of inlet ports 34 located on the upper portion of the fuel distribution network 70 and the top cover 36a. The fuel vapor separator 30 removes vapor from the excess fuel and vents it through a vent port 60. The excess fuel is then transferred back to the fuel pump 130 via an outlet port 42 for recirculation.

Figure 3:
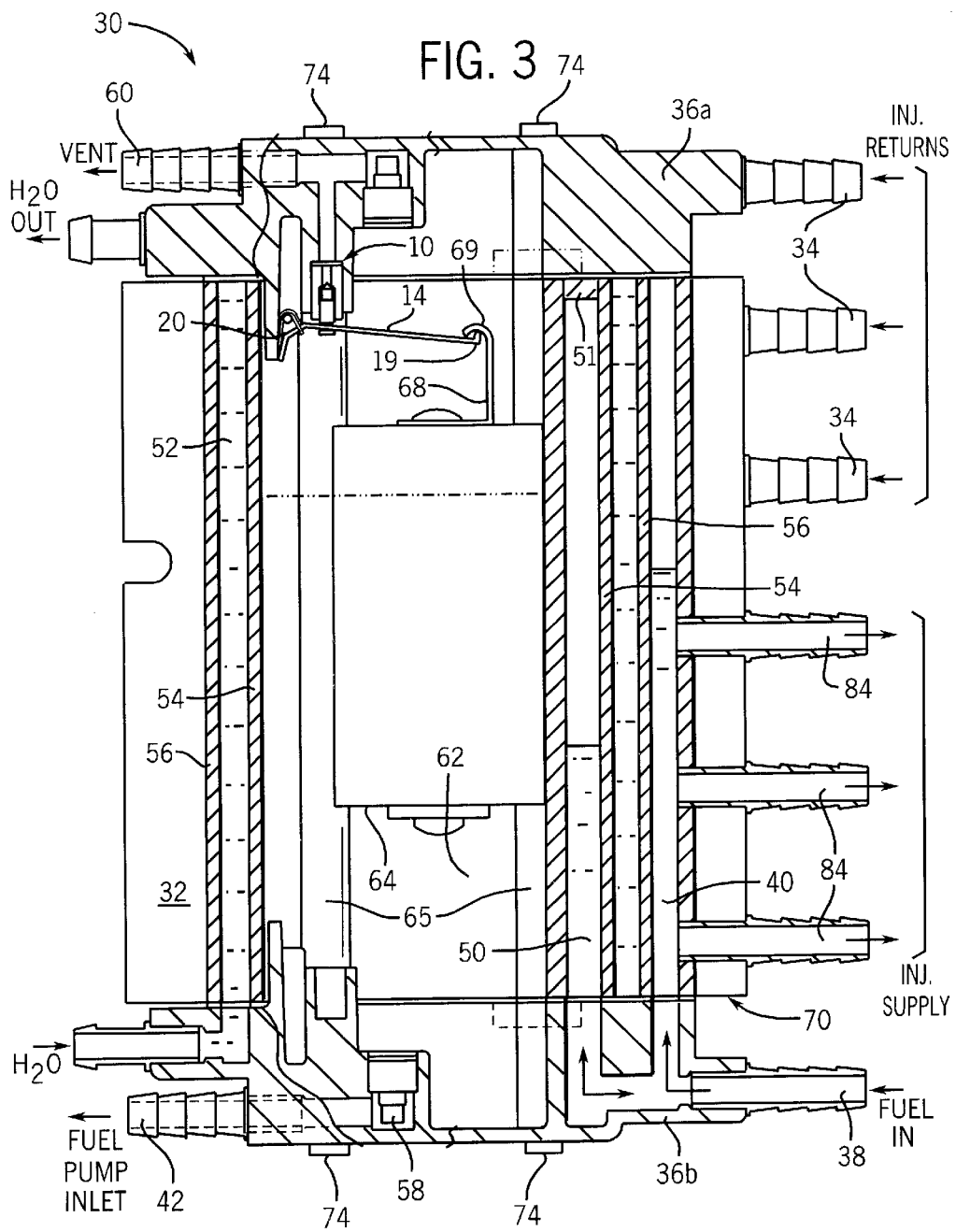
FIG. 3 is a sectional elevation view of a fuel vapor separator incorporating the closed biased vent valve of FIG. 1.

Still referring to FIG. 3, the housing 32 has an internal wall 54 and an external wall 56 spaced from one another to form a coolant jacket 52 through which water is circulated under pressure from the engine's water cooling pump (not shown). To maintain a constant high pressure, e.g., 15 psi, within the fuel injectors, a pressure regulator (not shown) is mounted in the fuel supply passage 40. A fuel damper chamber 50 is also in fluid communication with fuel inlet 38 to absorb fuel pressure surges. The fuel damper chamber 50 is incorporated into the fuel vapor separator 30 to accommodate undesirable foam in the fuel separator 30 caused by fuel traveling at high pressure and high velocity. Additionally, air and fuel vapor being returned to the fuel vapor separator 30 can also agitate the pool of liquid fuel causing the fuel to foam and vaporize. Fuel foaming is highly undesirable because, should the amount of foam in the fuel vapor separator 30 become excessive, foam may be pumped to the engine, resulting in lean engine operation, stalling, or overheating of the engine. The fuel damper chamber 50 absorbs pressure surges within the incoming fuel and reduces fuel foaming. The fuel damper chamber 50 is located longitudinally along the housing 32 of the fuel vapor separator 30 and is plugged at its upper end by plug 51. Pressure surges at the inlet port 38 are cushioned by the flow of fluid into fuel damper chamber 50 against resistance provided by the compression of vapors in the upper end of fuel damper chamber 50, thereby damping the pressure surges and reducing foaming.

Still referring to FIG. 3, the fuel vapor separator 30 removes vapor from the excess fuel and transfers excess fuel back to the fuel pump 130 through the outlet port 38. A check valve 58 is located in the bottom cover 36b to maintain a fuel pressure higher than the fuel pressure at the inlet port of the fuel pump 130. Therefore, the check valve 58 ensures that the fuel pump 130 does not draw fuel from the fuel vapor separator 30.

Figure 4:
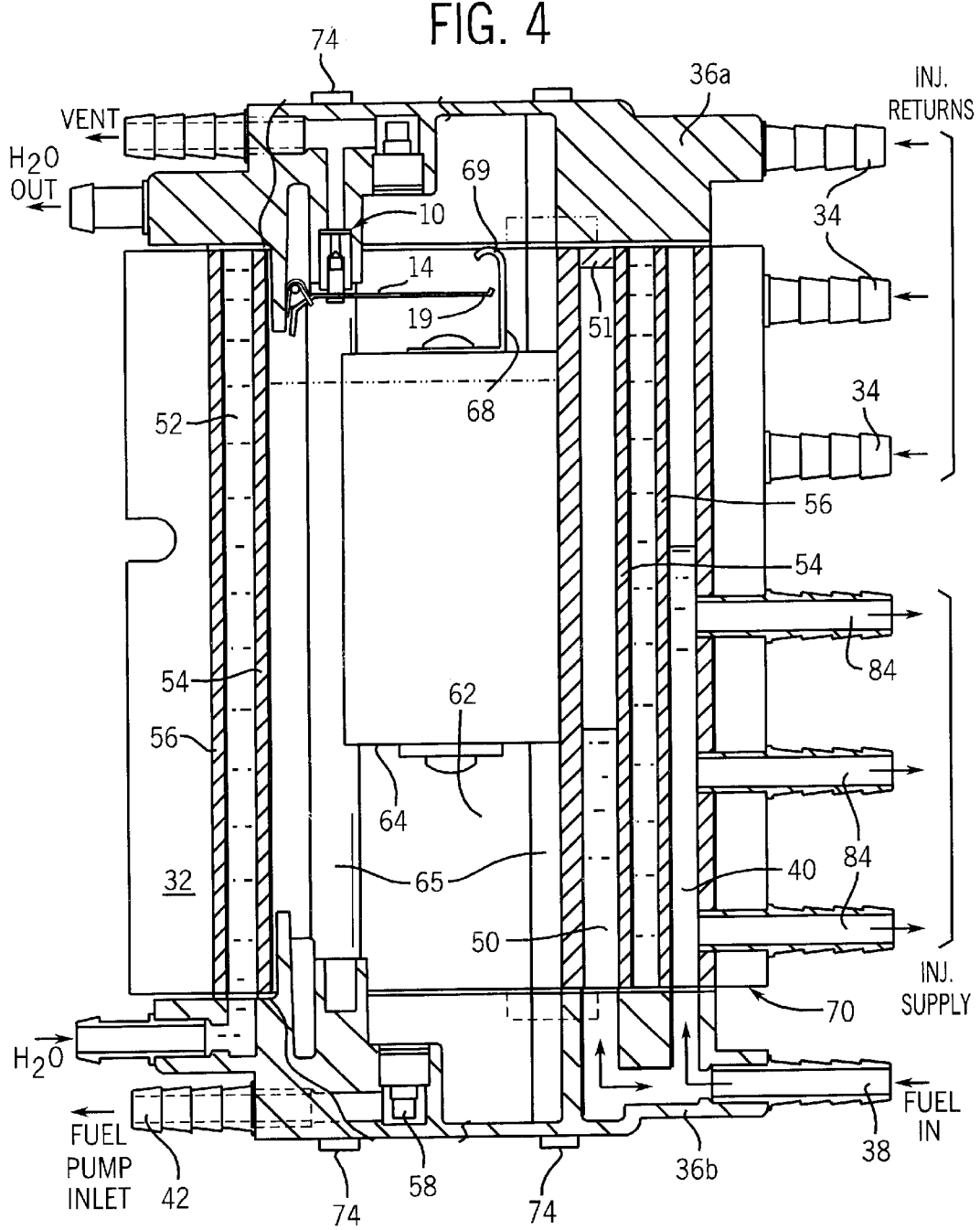
FIG. 4 is a sectional elevation view of the fuel vapor separator of FIG. 3 showing the closed biased vent valve in a closed position and the float in a disengaged position.

Now referring to FIG. 4, the closed biased vent valve 10 is operated by a float 64 which is installed in the fuel chamber 62 of the fuel vapor separator 30 and has an upwardly extending float arm 68 that pivots the lever arm 14 against the force of the spring 20. Specifically, the upwardly float arm 68 and the lever arm 14 have hooks 69 and 19, respectively. When the fuel vapor separator 30 is filled with fuel to a designated fill level with a consequent upward movement of the float 64, the hook 69 and the hook 19 decouple from one another. As a result, the closed biased vent valve 10 remains in its closed position. Conversely, when the fuel vapor separator 30 is empty, or the fluid level in the enclosed fuel chamber 62 is depleted due to the accumulation of vaporized fuel in the enclosed fuel chamber 62, the float 64 drops below the designated level in the enclosed fuel chamber 62. During this movement, the hook 69 and the hook 19 couple with one another and pull the needle 12 downward to place the valve 10 in its open position to release vaporized fuel from the fuel vapor separator 30.

Advantageously, the float 64 is configured to move vertically within the enclosed fuel chamber 62 without opening the closed biased vent valve 10, thereby reducing engine spit. The enclosed fuel chamber 62 is constructed to hold a fuel float 64 laterally and to allow float 64 movement vertically. To achieve this effect, the float 64 has a cross sectional shape that at least substantially matches the cross sectional shape of the enclosed fuel chamber 62, which controls the movement of the float 64. This shape is defined in part by a pluralilty of extruded bosses 65 between which the float 62 is sized to fit. The extruded bosses are bored and threaded to receive the bolts 74 that retain the top and bottom covers 36a, 36b for the housing 32. This design eliminates the need for a secondary valve to prevent fuel vapor or liquid from escaping if the fuel vapor separator 30 is tilted from its vertical position, and further renders the float 64 and the closed biased vent valve 10 much less susceptible to vibration-induced vent opening and resulting engine spit.

Figure 5:
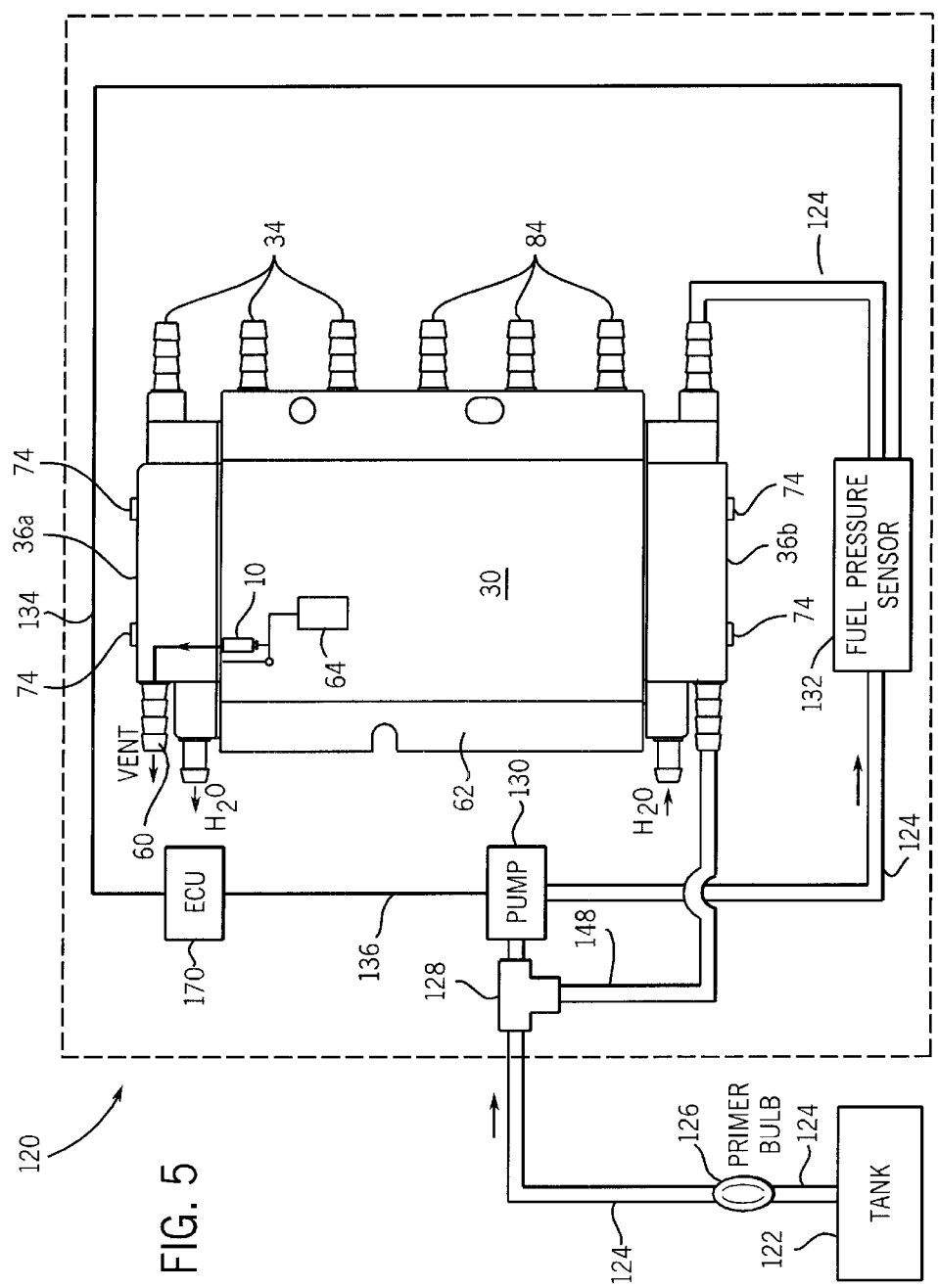
FIG. 5 is a schematic diagram of a fuel delivery system employing the fuel vapor separator of FIGS. 3–4.

Referring now to FIG. 5, a fuel delivery system 120 is illustrated that incorporates a preferred embodiment of the present invention. The fuel delivery system 120 is located on an outboard marine engine (not shown). A primer bulb 126 is used only to prime the fuel delivery system 120 with fuel prior to starting the engine. A high pressure electric fuel pump 130 draws fuel from the fuel tank 122 via a fuel supply line 124 and transfers fuel into the fuel vapor separator 30. A pressure sensor 132 is located in the fuel supply line 124 downstream of the fuel pump 130. The fuel vapor separator 30 is connected to Tee-connector 128 located upstream of the fuel pump 130 via the fuel supply line 124. A pressure regulator (not shown) comprises a check valve that is located in the fuel vapor separator 30. The check valve maintains a fuel pressure that is higher than the fuel pressure at the inlet port of the fuel pump 130. For instance, the check valve may maintain a pressure differential of 6 psi. If the pressure differential across the check valve exceeds 6 psi, then the check valve will open and allow excess fuel to flow from the fuel vapor separator 30 to the fuel pump 130.

Typically, to keep the length of the pressurized fuel lines 124, 148 as short as possible, the high pressure fuel pump 130, fuel vapor separator 30, and pressurized fuel lines 124, 148 are integrated as part of the engine assembly and are housed under the engine cowling.

An engine control unit (ECU) 170 receives a pressure signal 134 from the pressure sensor 132 and transmits a fuel supply signal 136 to fuel pump 130. Based, at least in part on these signals, the ECU 170 controls the operation of the pump 130 to maintain a commanded, possibly constant pressure at each fuel injector so that each fuel injector precisely meters proper quantities of fuel for efficient operation of the engine. Fuel not used by the fuel injectors returns to the fuel vapor separator 30 through inlet ports 34.

The present invention provides a vent control system having a closed biased vent valve. The invention includes a float having an upperly extending float arm and a lever arm, which selectively disengages from one another upon unwanted float movement within a chamber to prevent unintended release of vapor or liquid from the chamber. This vent control system reduces engine sputtering caused by fuel entering the engine through the vent system and is less susceptible to vibration-induced vent opening.

Accordingly, a method to reduce engine spit is provided. The method includes transferring fuel into an enclosed fuel chamber from at least one fuel injector through a plurality of fuel inlet ports, and venting vapor accumulating within the enclosed chamber via selective opening of a closed biased vent valve. The method also includes allowing vapor to vent from the enclosed fuel chamber when the float is pulling downward on the closed biased vent valve to open the closed biased vent valve. The method also includes allowing float movement by allowing an upwardly extending float arm of the float to decouple from a lever arm of the closed biased vent valve when the float rises above a designated level within the enclosed fuel chamber, thereby, reducing engine spit caused by unintended opening of the closed biased vent valve due to engine vibration.

The present invention has been described in terms of the preferred embodiment, and it is recognized that equivalents, alternatives, and modifications, aside from those expressly stated, are possible and within the scope of the appending claims.

What is claimed is:

1. A vent control system comprising:
   an enclosed chamber having a vapor outlet;
   a closed biased vent valve that selectively opens and closes the vapor outlet;
   a float having an upwardly extending float arm movable vertically within the enclosed chamber to open the closed biased vent valve;
   a lever arm connected to the closed biased vent valve, wherein the upwardly extending float arm and the lever arm are coupled to one another when the float is located beneath a designated level in the enclosed chamber and decouple from one another when the float rises above the designated level; and
   a housing having a plurality of extruded bosses and wherein the float is sized to snugly fit between the extruded bosses.

2. The vent control system of claim 1 further comprising a fuel vapor separator wherein the vent control system is mounted in the fuel vapor separator.

3. The vent control system of claim 1 wherein the housing has two opposed ends and has the enclosed chamber formed therein.

4. The vent control system of claim 1 wherein the plurality of extruded bosses are bored and threaded to retain a top cover and a bottom cover to the housing.

5. The vent control system of claim 1 wherein the enclosed chamber is constructed to snugly hold the fuel float laterally and to allow free float movement vertically.

6. The vent control system of claim 1 wherein the upwardly extending float arm has a hook at one end and the lever arm has a hook at one end and wherein the hook on the upwardly extending float arm and the hook on the lever arm are coupled to one another when the float is located beneath the designated level in the enclosed chamber and decouple from one another when the float rises above the designated level.

7. The vent control system of claim 1 further comprising a spring configured to bias the lever arm to a position closing the closed biased vent valve.

8. The vent control system of claim 7 wherein the closed biased vent valve includes a needle having a head that extends through a bore in one end of the lever arm and wherein another end of the lever arm is engaged by the spring.

9. A vent control system for a fuel vapor separator comprising:
   (A) a housing having an enclosed fuel chamber, a pin mounted to the housing and located in the enclosed fuel chamber, and a vapor outlet;
   (B) a fuel float located in the enclosed fuel chamber and having an upwardly extending float arm;
   (C) a closed biased vent valve that selectively opens and closes the vapor outlet; and
   (D) a lever arm having one end affixed to the pin via a spring mounted to the pin in the enclosed fuel chamber and an opposing end affixed to the fuel float, the lever arm further connected to the closed biased vent valve, wherein the upwardly extending float arm and the lever arm are coupled to one another when the float is located beneath a designated level in the enclosed fuel chamber and decouple from one another when the float rises above the designated level, and wherein the vent valve is biased closed by a biasing force from the spring on the lever arm.

10. The vent control system of claim 9 wherein the enclosed fuel chamber is constructed to hold the fuel float laterally and to allow free float movement vertically.

11. The vent control system of claim 9 wherein the housing includes an internal passage between an internal wall thereof and an external wall thereof for circulating liquid coolant for cooling the fuel.

12. The vent control system of claim 9 wherein the enclosed fuel chamber is constructed to hold the fuel float laterally and to allow free float movement vertically.

13. The vent control system of claim 9 wherein the upwardly extending float arm has a hook at one end and the lever arm has a hook at one end and wherein the hook on the upwardly extending float arm and the hook on the lever arm are coupled to one another when the float is located beneath the designated level in the enclosed fuel chamber and decouple from one another when the float rises above the designated level.

14. A fuel delivery system comprising:
   means for transferring fuel into an enclosed fuel chamber;
   means for venting vapor accumulated within the enclosed fuel chamber through a closed biased vent valve;
   means for biasing the vent valve to a closed position, said means located in and hinged to the enclosed fuel chamber and external to the vent valve;

a lever arm having three planar portions, a first planar portion at one end of the lever arm to abut a wall of the enclosed fuel chamber, a second planar portion at a mid-section of the lever arm for contact with the means for biasing, and a third planar portion at another end of the lever arm and having an end disengage ably connected to a float and having a bore in a mid-section of the third planar portion to receive therein a portion of the vent valve; and means for allowing float movement vertically without opening the closed biased vent valve within the enclosed fuel chamber thereby reducing engine spit caused by unintended opening of the closed biased vent valve due to engine vibration.

15. A vent control system for a fuel vapor separator comprising:

a housing having an enclosed fuel chamber and a vapor outlet;

a fuel float having a cross-sectional shape substantially similar to that of the enclosed fuel chamber to slid ably move vertically within the enclosed fuel chamber while restricting lateral movement of the fuel float within the enclosed fuel chamber, the fuel float having an upwardly extending float arm attached thereto;

a closed biased vent valve comprised of a needle and seat that selectively opens and closes the vapor outlet; and a lever arm connected to the closed biased vent valve, wherein the upwardly extending float arm and the lever arm are coupled to one another when the float is located beneath a designated level in the enclosed fuel chamber and decouple from one another when the float rises above the designated level, wherein the lever arm is planar-shaped and is pivotally connected to the housing at a first end via a biasing mechanism that biases the vent valve closed and has a second end having a hook portion extending upwardly to detachably couple the lever arm to a corresponding hook portion on the upwardly extending float arm, the lever arm also having a bore in the planar-shaped lever arm between the first and second ends to receive a portion of the needle therein to move the needle with respect to the set of the vent valve.

* * * * *

UNITED STATES PATENT AND TRADEMARK OFFICE
CERTIFICATE OF CORRECTION

PATENT NO.     : 6,431,199 B1
DATED          : August 13, 2002
INVENTOR(S)    : Richard P. Kolb et al.

It is certified that error appears in the above-identified patent and that said Letters Patent is hereby corrected as shown below:

Column 7,
Line 6, delete "disengage ably" and substitute therefor -- disengageably --;
Line 20, delete "slid ably" and substiute therefor -- slidably --;

Column 8,
Line 19, delete "set" and substitute therefor -- seat --.

Signed and Sealed this

Fifteenth Day of October, 2002

Attest:

Attesting Officer

JAMES E. ROGAN
Director of the United States Patent and Trademark Office